US005205124A

United States Patent [19]

Budzich, deceased

[11] Patent Number: 5,205,124

[45] Date of Patent: Apr. 27, 1993

[54] PISTON MOTOR WITH STARTING CHARGE DEVICE

[75] Inventor: Tadeusz Budzich, deceased, late of Moreland Hills, Ohio, by Euphemia Agnes Marshal Budzich, executrix

[73] Assignee: Caterpillar Inc., Peoria, Ill.

[21] Appl. No.: 821,204

[22] Filed: Jan. 16, 1992

[51] Int. Cl.[5] ........................ F16D 31/02; F01B 1/00; F01M 1/00

[52] U.S. Cl. ........................................ 60/456; 60/488; 92/56; 92/154; 91/485; 184/6.17

[58] Field of Search ..................... 60/456, 469; 91/6.5, 91/484, 485, 487; 92/56, 154; 184/6.17, 29, 39

[56] References Cited

U.S. PATENT DOCUMENTS

| | | | |
|---|---|---|---|
| 2,298,850 | 10/1942 | Vickers | 103/162 |
| 3,073,253 | 1/1963 | Schollhammer | 103/162 |
| 3,181,477 | 5/1965 | Matthews | 91/485 |
| 3,800,672 | 4/1974 | Kobald | 91/487 |
| 3,980,003 | 9/1976 | Huebner et al. | 91/487 |

*Primary Examiner*—Edward K. Look
*Assistant Examiner*—John Ryznic
*Attorney, Agent, or Firm*—J. W. Burrows

[57] ABSTRACT

A hydraulic piston type motor having a rotating piston barrel abutting a fixed porting plate or head with a starting charge device including a differential area piston operating to supply a limited hydrostatic pressure between the porting plate and rotating barrel to reduce starting friction and improve starting torque.

5 Claims, 3 Drawing Sheets

OPEN LOOP

CLOSED LOOP

PISTON MOTOR WITH STARTING CHARGE DEVICE

TECHNICAL FIELD

The invention applies to the field of piston type hydraulic motors of the type often used in conjunction with a piston pump to comprise a hydrostatic drive system used to power a work vehicle.

BACKGROUND ART

Piston type hydraulic pumps/motors of the type having a rotating barrel containing a plurality of pumping pistons are well known. An illustrative pump motor configuration is contained in U.S. Pat. No. 3,980,003. As described in that patent, hydrostatic balancing forces are developed at the interface of a fixed porting surface of a porting plate or end cap and rotating piston-containing barrel, to provide lubrication, but maintain fluid leakage sufficiently low to avoid a substantial negative effect on pumping efficiency. U.S. Pat. No. 2,298,850 teaches the use of hydraulic force pads similar to those employed in this invention but which are fed a constant but small amount of fluid to regulate the separation of the porting plate and rotating barrel over its full range of operation. When operating in a motor mode and the motor is at rest with no driving fluid being supplied, the barrel and port plate are in metal-to-metal contact. This establishes a coefficient of friction higher than that during normal operation giving the motor a poor starting torque characteristic. Starting torque is a critical design criterion which often determines the motor size for a certain load requirement. A pump larger than needed for normal running will often need to be selected to overcome start-up resistance. Additional hydrostatic separation liquid may be applied to eliminate this condition, but if such augmented hydrostatic separation forces are applied throughout the running regime, the motor will experience excessive leakage and a reduction in efficiency during normal running.

DISCLOSURE OF THE INVENTION

The present invention provides means to supply a short-term augmented hydrostatic port and barrel separation force and lubrication at start-up to reduce starting torque and to terminate such augmentation during normal running to avoid degrading running efficiency.

The invention is carried out by a supplementary charge device that maintains a measured charge of fluid which is actuated to deliver the augmented fluid to the high pressure side of the port and barrel interface when high pressure fluid is first applied to the motor. The charge dissipates or is used up after several moments or revolutions of operation so that the motor runs at its optimum design efficiency after rotation has started. On shut down, the absence of high pressure applied to the motor triggers the supplementary charge device to restore the measured fluid quantity and be at a state of readiness for the next cycle.

BEST MODE FOR CARRYING OUT THE INVENTION

Figure 1:
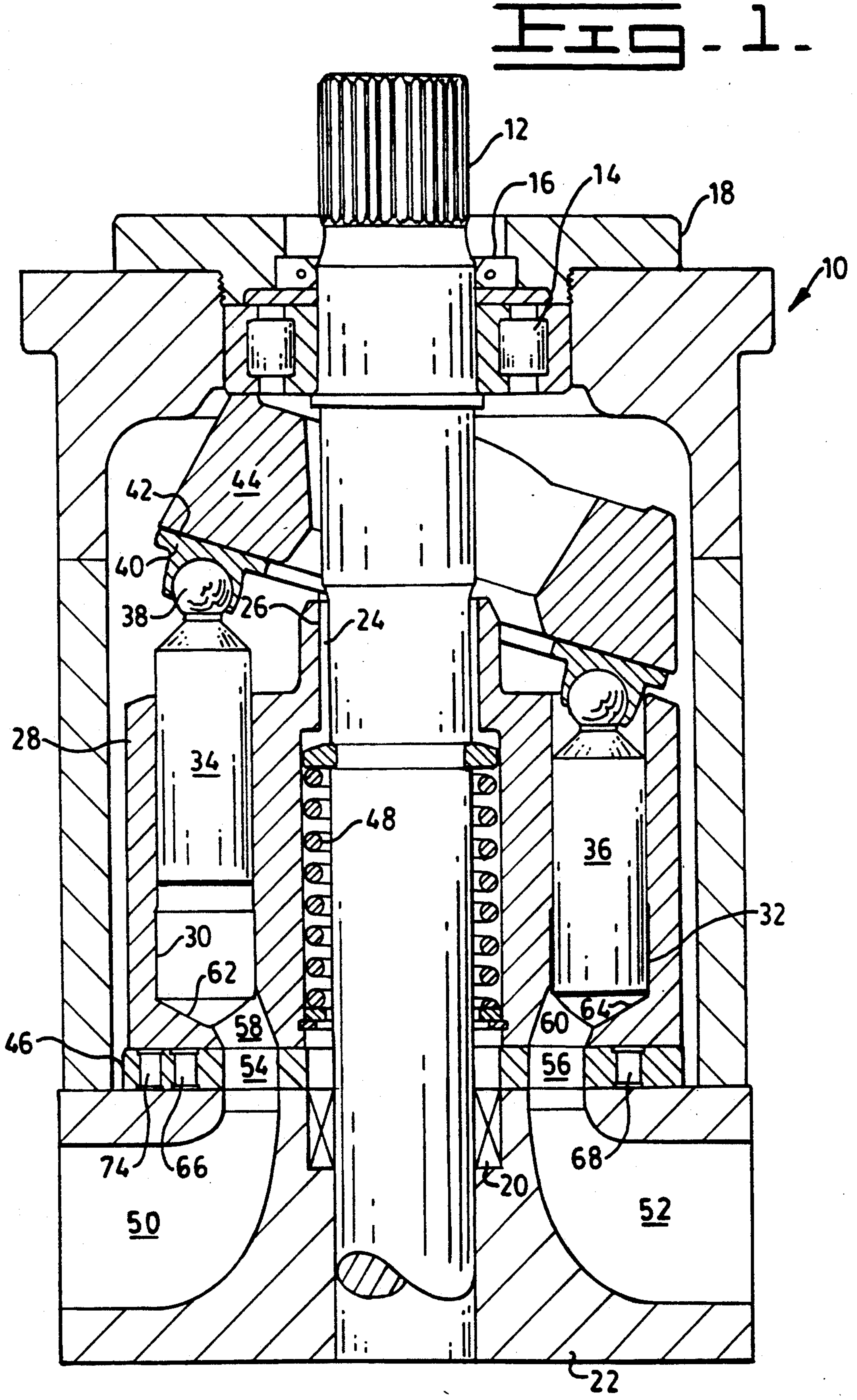
FIG. 1 illustrates a piston type motor in cross section containing in particular a hydrostatically balanced interface between port plate and rotatable barrel.

Referring to FIG. 1, there is illustrated a piston motor having an external main housing 10, an output shaft 12 mounted in bearing 14 retained in the main housing 10 near one end. A lubrication seal 16 is retained by nut 18 threaded into the housing. The output shaft 12 traverses through the center of the motor and is mounted in a bearing 20 at its other end which in turn is retained by end cap 22. Intermediate the bearing locations, output shaft 12 has formed spline 24 which engages mating splines 26 of the piston barrel member 28. Piston barrel member 28 contains a plurality of cylindrical bores arranged uniformly along a circular line at a radial distance from the centerline of the barrel. Two such cylindrical bores are illustrated and indicated by numbers 30 and 32, respectively. Cylindrical pistons are placed in the barrel bores as indicated by numerals 34 and 36. At the upper end of the piston there is formed a spherical bearing 38 which is retained in slipper 40 which slides about the inclined surface 42 of the swash plate or guide block 44. Between the end cap 22 and piston barrel member 28, there is disposed a porting plate or member 46. In the static condition without applied fluid, piston barrel member 28 is resiliently urged into abutment with the porting plate 46 by spring 48 captured between the output shaft 12 which is axially fixed and the axially movable barrel member.

End cap 22 contains inlet and outlet passages 50 and 52, respectively, which direct fluid to the inlet port 54 and the outlet port 56 formed in the porting plate. High pressure motor driving fluid supplied through inlet passage 50 and inlet port 54 passes through cylinder passage 58 into cylinder bore 30 applying a driving force to the end of piston 34 causing the barrel to rotate so the piston may traverse to the upper end of the bore as illustrated. As rotation of the barrel continues, the piston will descend along the inclined surface 42 to the position illustrated on the right side of FIG. I. During its descent, piston 36 will expel fluid out its bore through its cylinder passage 60, outlet port 56 and outlet passage 52. The rotation of the barrel, of course, drives output shaft 12 rotationally through mating splines 24 and 26 to provide useful work.

When fluid is applied to the motor, hydraulic forces are also applied which contribute to the force balance between the face of piston barrel member 28 and the porting plate or member 46. One fluid applied force is that contained in the cylinder bores 30 acting against the end surfaces 62 and 64 minus the area of cylinder passages 58 and 60. This force further urges the barrel into contact with the porting plate 46 assisting spring 48. However, as the inlet pressure in the chamber containing piston 34 is greater than the exhaust pressure acting on piston 36, the pressure loading on the inlet side is greater than that on the outlet side.

Figure 2:
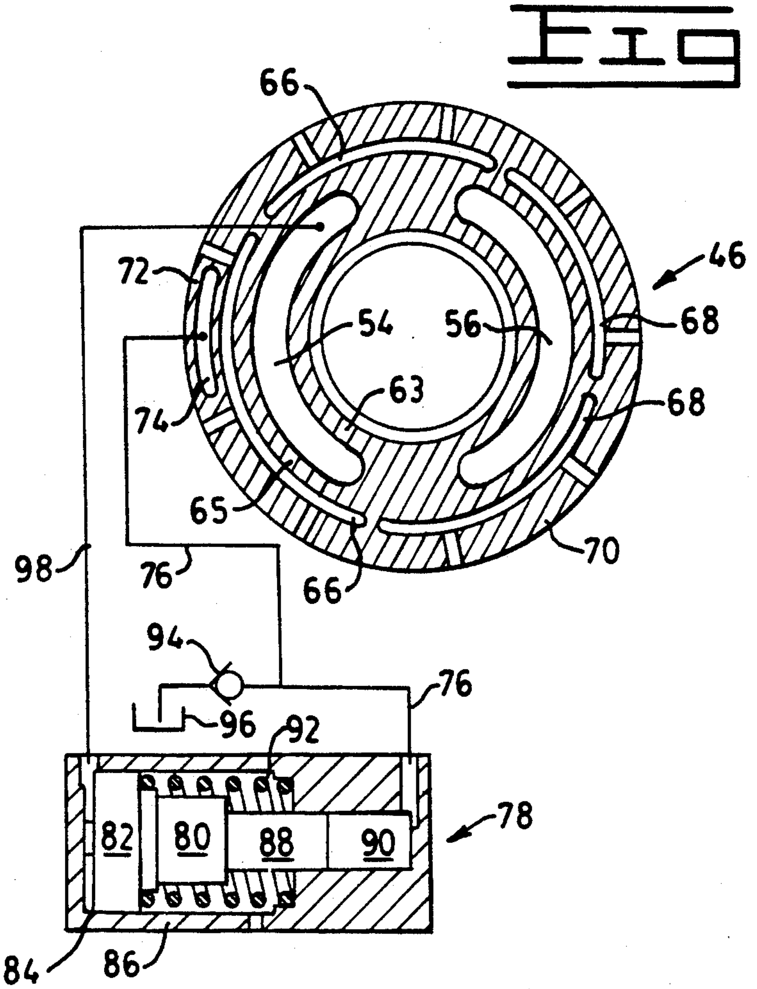
FIG. 2 is a plan view of a port plate showing in particular the force augmenting pads and in schematic one embodiment of an associated supplementary charge device.

Referring to FIG. 2, porting plate 46 is shown in plan view illustrating the face that is in contact with piston barrel member 28. Inlet port 54 and outlet port 56 are the conventional kidney-shaped ports formed about an arcuate path traversing somewhat less than 180°. Each port communicates with several pistons on the driving and discharge strokes, respectively. Hydrostatic lands or bearing surfaces 63 and 65 are formed on the face of the plate radially inwardly and radially outwardly respectively of the inlet and outlet ports. Fluid from the inlet port 54 and outlet port 56 is permitted by controlled leakage to lubricate the face of lands 63 and 65 and provides a hydrodynamic pressure that reacts against the barrel face tending to balance some of the aforementioned forces. It is noted the fluid pressure from inlet port 54 will be higher than that from outlet port 56 tending to balance the higher forces acting at the end surfaces 62 of cylinder bore 30 on the high pressure motor side. As is known, the applied forces between the port plate and barrel are close to being in balance during normal motor operation with a small unbalance in the clamping direction to avoid excessive leakage.

Returning to the porting plate illustrated in FIG. 2, there are formed drainage ports 66 and 68. Depending on motor design, there may be formed a static bearing surface 70 radially outward to help resist barrel tipping under the influence of unbalanced hydraulic and rotating forces. There is formed in the static bearing surface a force pad 72 containing an arcuate groove or opening 74 which is radially aligned with the high pressure inlet port 54 and on the same side of the porting plate. Connected to opening 74 in force pad 72 through arcuate groove 76 is a supplementary charge device (SCD) generally designated by numeral 78. The supplementary charge device contains a differential area piston 80 having a large area end 82 in chamber 84 formed in housing 86. A smaller area end 88 of differential area piston 80 protrudes into charge chamber 90. Spring 92 biases differential area piston 80 in a direction to expand charge chamber 90. Passage 76 is connected through check valve 94 to fluid reservoir 96 so that as spring 92 biases differential area piston 80 to the left, a fill charge of fluid is drawn into charge chamber 90 from fluid reservoir 96. To reduce the possibility of trapped air in charge chamber 90, the supplementary charge device 78 may be located in the reservoir 96 below the fluid level. The large area end of differential area piston 80 is fluidly connected by passage 98 to inlet port 54.

Figure 4:
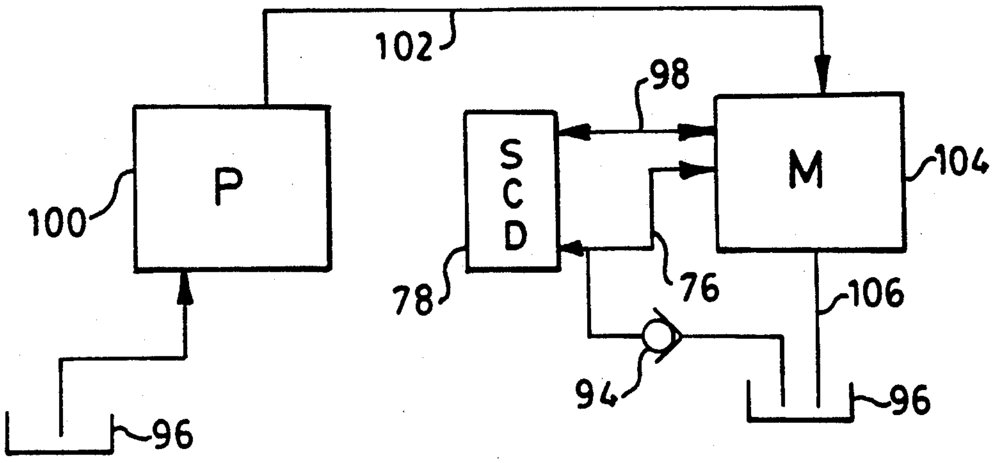
FIG. 4 is a schematic illustration of an open loop system to which the first embodiment is best suited.

The embodiment illustrated in FIG. 2 is operative with an open loop pump/motor system as illustrated in FIG. 4. A general system of this type consists of a pump 100 delivering high pressure fluid through passage 102 to piston type motor 104 of the type described herein. Motor discharge fluid is transmitted by passage 106 to fluid reservoir 96. The supplementary charge device 78 is connected to the motor by the previously described arcuate groove 76 and passage 98.

INDUSTRIAL APPLICABILITY

The operation of the open loop embodiment will now be described. When the motor is at rest, the substantially dry or unlubricated surfaces of the port plate and barrel are in clamping contact. When high pressure fluid is applied to drive the motor, a higher than normal coefficient of resistance exists giving the motor very poor starting torque characteristics. However, when high pressure fluid is received in inlet port 54, it is transmitted by passage 98 to the large area end of differential area piston 80 causing the piston to move to the right discharging the fluid in charge chamber 90 at a pressure intensified level. This high pressure is transmitted to the force pad 72 and acts against the face of the barrel to separate the port and barrel surfaces and reduce friction at start up. This separation continues only until the measured charge in chamber 90 is exhausted, at which time the motor is rotating and under normal running conditions. The volumetric efficiency of the motor is affected adversely only briefly during initial rotation and remains unaffected under normal running conditions.

Figure 5:
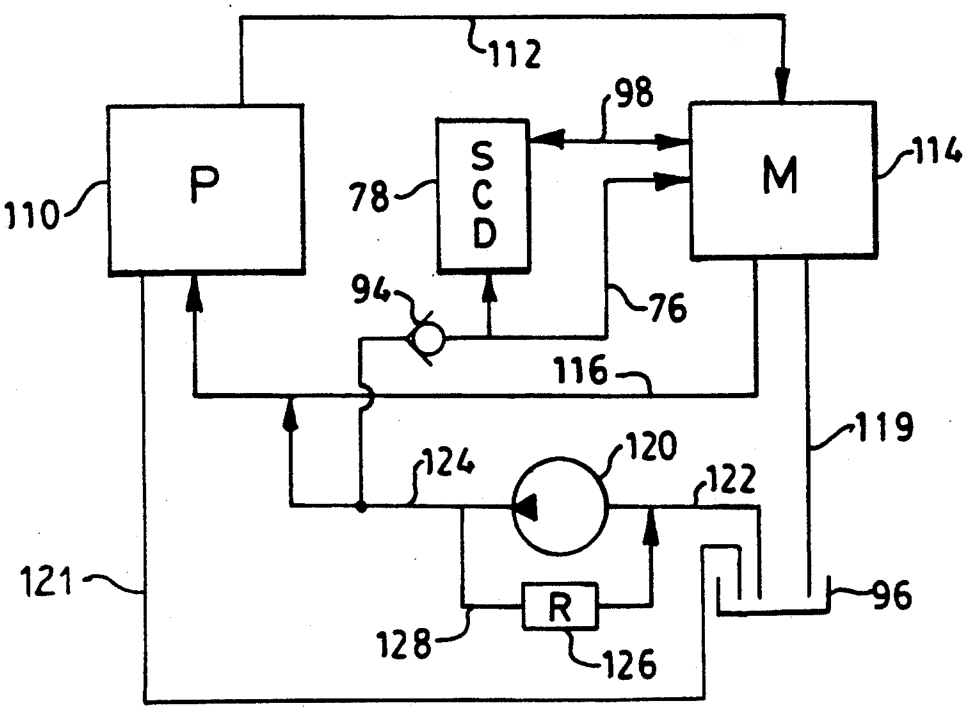
FIG. 5 is a schematic illustration of a closed loop system which most effectively employs the second embodiment.

It is common to use paired arrangements of piston pumps and motors in hydrostatic drive system. A simple unidirectional closed loop system is schematically illustrated in FIG. 5. Pump 110 supplies high pressure drive fluid through passage 112 to motor 114 of the type described herein. In this arrangement, the motor discharge is recirculated by passage 116 back to the pump to supply the pump inlet fluid source. Certain pump and motor leakage and excesses due to transient conditions are transmitted to fluid reservoir 96 by passages 119 and 121. Such arrangements generally have fluid make up means such as charge pump 120 supplying make up fluid from fluid reservoir 96 through passages 122 and 124 to the passage 116. Charge pump 120 pressure is regulated by relief valve 126 in recirculating passage 128.

Figure 3:
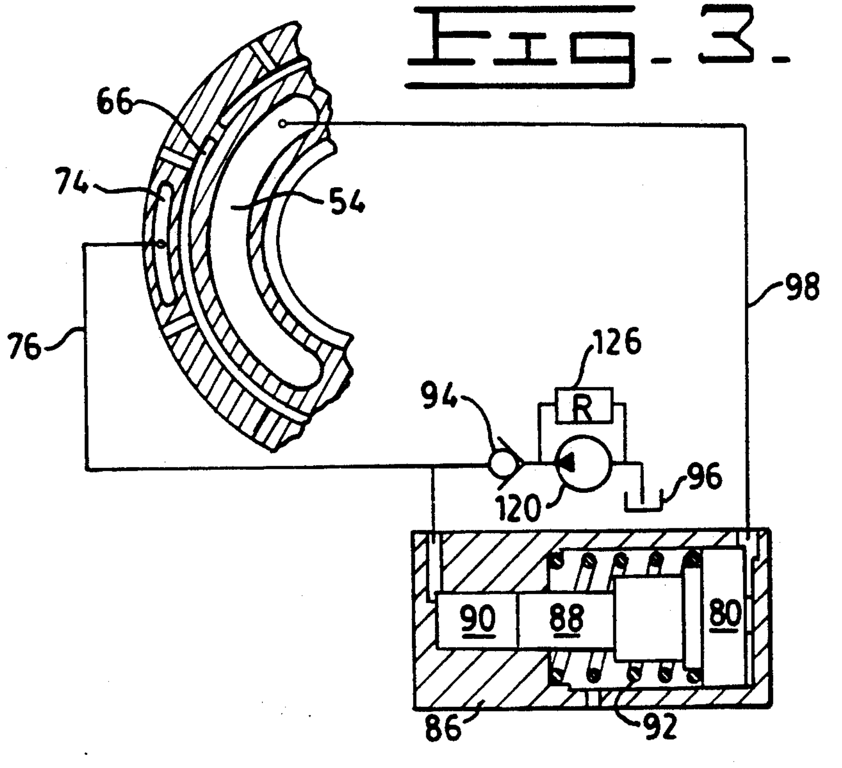
FIG. 3 is a plan view or a partial segment of a port plate and a schematic illustration of a second embodiment of the invention.

Referring to FIG. 5 as well as FIG. 3, the supplementary charge device 78 is illustrated which, when operating with a closed loop system, can take advantage of the existence of an accessory pump in the system such as the charge pump 120. In this arrangement, the charge device draws fluid from fluid reservoir 96. When high pressure fluid is terminated and not supplied to the motor as during shut down, the pressure at the large area end of differential area piston 80 is also terminated. Spring 92 moves the piston to the right allowing charge pump 120 to fill charge chamber 90. During motor start-up, charge pump 120 may be phased to supply fluid ahead of high pressure drive fluid to the motor to insure a full charge of augmenting fluid in charge chamber 90.

The invention is described in connection with unidirectional pump and motor systems. For bidirectional systems, two supplementary charge device mechanisms may be used connected to two force pads, one on either side of the porting plate to operate as disclosed on the high pressure side. In such an application, spring 92 could be selected to provide sufficient resistance to prevent movement of piston 80 when exposed to low pressure motor discharge fluid so that only the one operating on the high pressure side is operative.

From the above Description it can be seen that augmenting fluid means have been provided to induce temporary separation of the barrel and port plate to overcome high torque resistance during start-up. This characteristic often determines the size of the motor selected for a given application. Thus, the invention permits selection of a lower cost smaller pump for certain applications while not having a negative effect on running efficiency.

I claim:

1. A fluid pressure driven motor having a rotatable driven piston barrel member containing a plurality of pistons reciprocable within cylinder bores in the piston barrel member, an output shaft connected to and driven by said piston barrel member and a fixed porting plate member abutting the barrel containing inlet and outlet arcuate shaped slots in alignment with said pistons to supply fluid to and receive fluid from said pistons, respectively, said porting member having bearing surfaces radially inwardly and outwardly of said inlet and outlet ports which receive fluid for lubrication and provide a hydrodynamic bearing surface, said porting plate member further containing a force pad along a radius passing through said inlet port, said force pad having an opening abutting said piston barrel member, the improvement comprising:

a supplementary charge device having a charge chamber containing a quantity of fluid, passage means connecting said charge chamber to said opening formed in said force pad, and differential area piston means actuated by high pressure motor driving fluid to expel said quantity of fluid into said opening during the motor starting phase to induce temporary separation between the barrel and said porting member.

2. A fluid pressure driven motor as claimed in claim 1 wherein said differential area piston means is biased in one direction by spring to permit charge chamber to accept a quantity of fluid when high pressure motor driving fluid is absent.

3. A fluid pressure driven motor as claimed in claim 2 wherein said charge chamber is connected to a low pressure fluid reservoir through a one-way check valve which permits flow from the fluid reservoir to the charge chamber.

4. A fluid pressure driven motor as claimed in claim 2 wherein said charge chamber is connected to a charge pump to receive fluid when high pressure motor driven fluid is absent.

5. A fluid pressure driven motor as claimed in claim 2 wherein said differential area piston means is a differential area piston with its large area end exposed to high pressure motor driving fluid when present and whose smaller area end is operative with said chamber to expel the fluid contained therein at a pressure intensified level.

* * * * *